Nov. 8, 1966   W. W. NIGHTINGALE   3,283,632
CONTINUOUSLY-FED VENEER CLIPPER
Filed Jan. 11, 1965   2 Sheets-Sheet 2
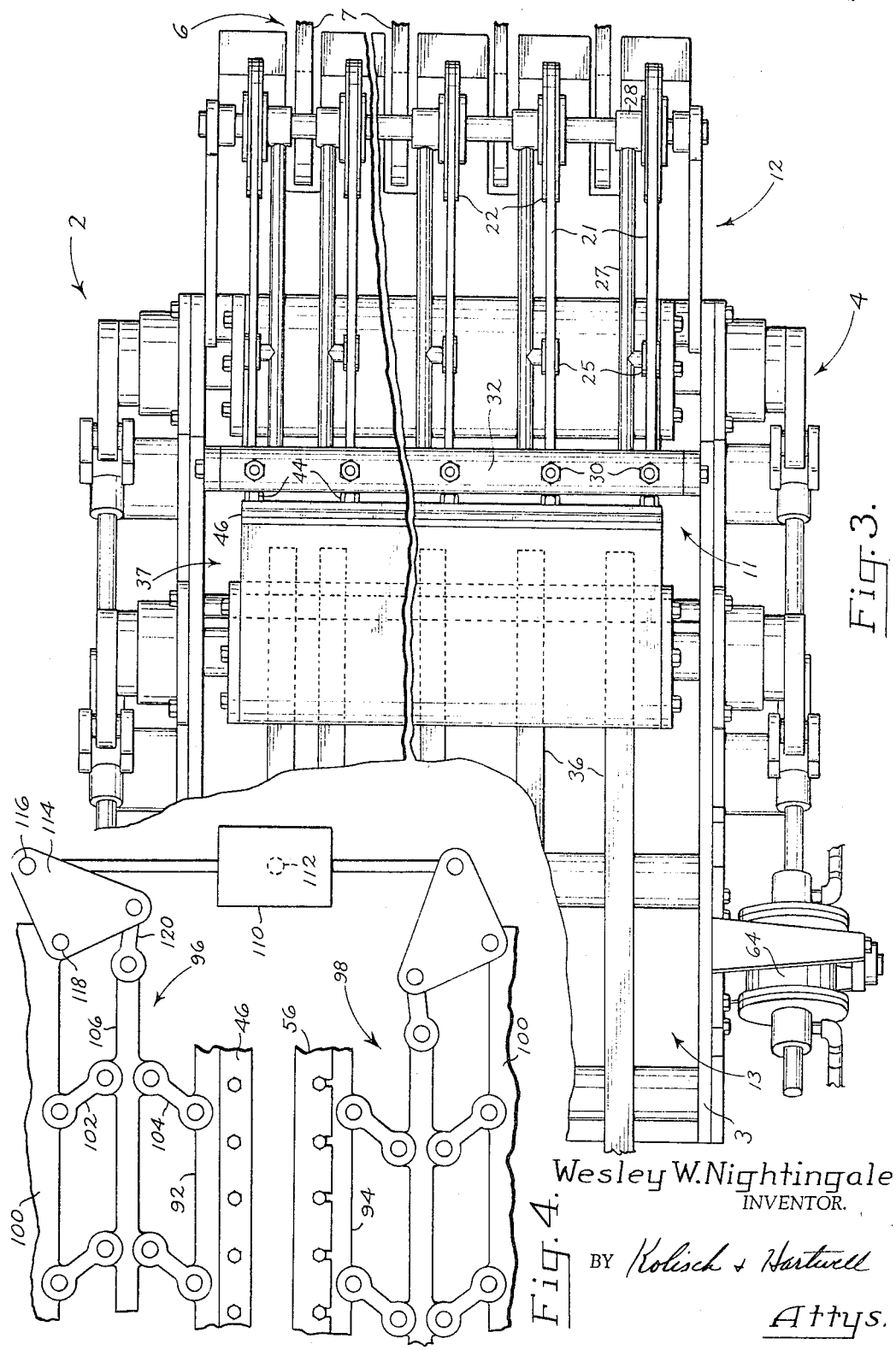
Wesley W. Nightingale
INVENTOR.
BY Kolisch & Hartwell
Attys.

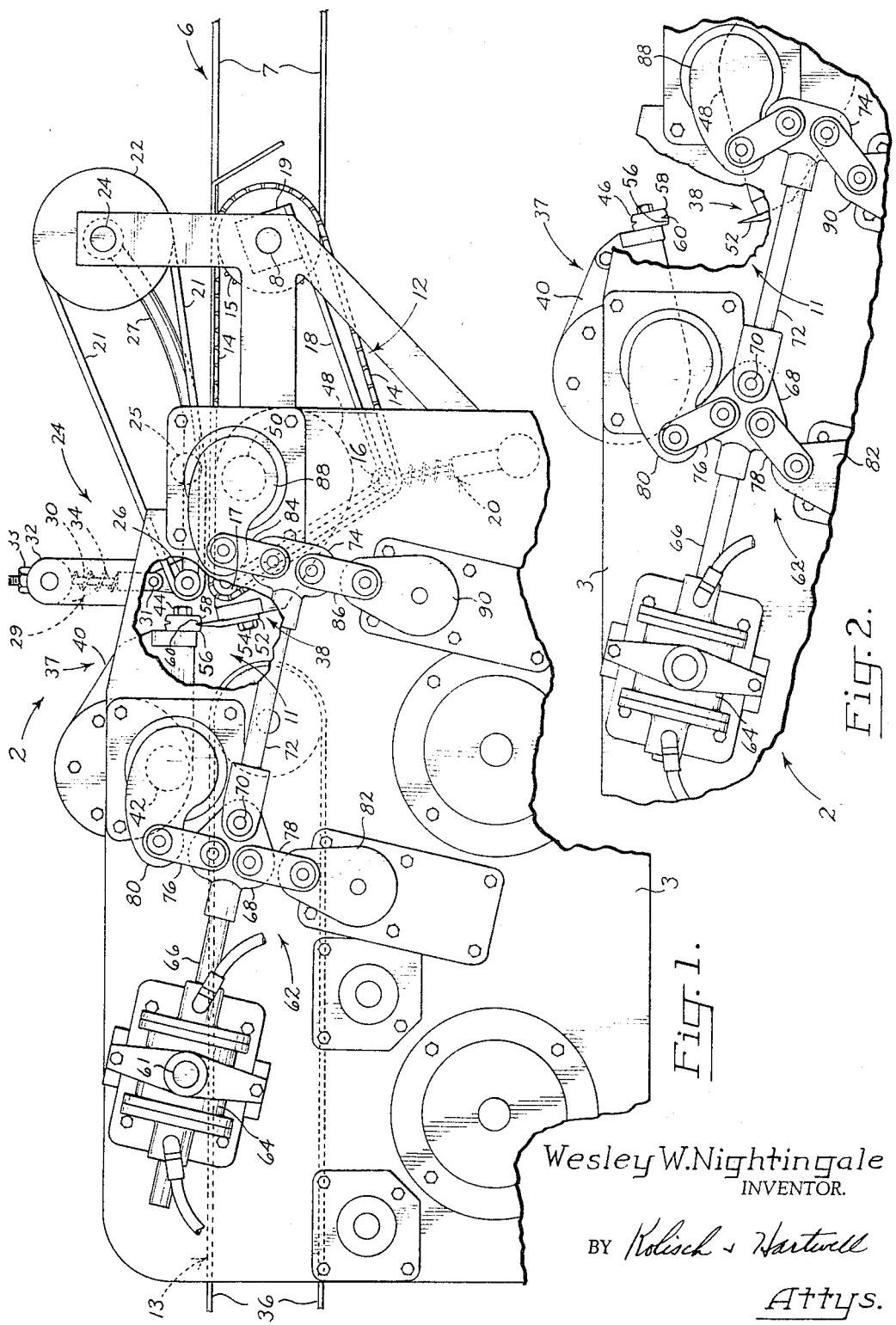

United States Patent Office 3,283,632
Patented Nov. 8, 1966

3,283,632
CONTINUOUSLY-FED VENEER CLIPPER
Wesley W. Nightingale, Rte. 2, Box 163, Creswell, Oreg.
Filed Jan. 11, 1965, Ser. No. 424,487
5 Claims. (Cl. 83—262)

This invention relates to clippers, and more particularly to a clipper embodying improved cutting means for making rapid, clean cuts in sheets such as veneer and related types of workpieces.

Veneer clippers for cutting sheets of predetermined or random width have been in wide use in the plywood industry for many years. Since in most cases a veneer sheet while being cut moves continuously through a clipper, it is important that each cut be made rapidly, and that after cutting the feed edge of the uncut sheet remaining be quickly stripped free from the mechanism doing the cutting, to permit the uncut sheet to continue its travel into the clipper.

Prominent among cutting mechanisms presently available in veneer clippers are those which have a stationary anvil that lies under the sheet and a knife above and movable against the anvil to produce a cut. Clippers with "flying shears" including a pair of scissor-like knives are also known, but these are not too widely used in cutting veneer for reasons to be described.

In the knife and anvil arrangement the speed of cutting is limited by the speed at which the knife can be moved toward and away from the anvil. Using a fast speed for the feed of veneer into the clipper there is a tendency for the feed edge of the moving uncut sheet of veneer to compress and buckle against the knife, and then to follow the knife upwardly as it is raised from the anvil after making a cut. In order to prevent this lifting tendency, some kind of overhead stripping device is usually provided adjacent the knife.

In clippers or cutters including opposed movable knives offset from one another to produce a scissor-like cutting action, the cutting action is somewhat slow since the knives must move past each other in order to complete a cut. In addition, the problem of stripping a workpiece free from the knives is compounded, since the feed end of the uncut workpiece may follow either one of the opposed knives, on such knives separating. This may result in a "corrugation" effect in the sheet being cut, with the sheet having ripples formed therein extending generally in a transverse direction relative to the knives.

Preferably, in the construction of cutting mechanism for a clipper, any element performing cutting should be moved as rapidly as possible in cutting and return strokes. The less time taken to make a cut, the less time that there is available for compression to build between the element making the cut and the feed end of the uncut sheet or other workpiece which is behind the cutting element and being advanced thereinto. Hence, with the fastest possible cutting the less chance there is of the workpiece buckling behind the elements producing cutting. Additionally, the cutting elements should be so operated and arranged that stripping of the workpiece therefrom is accomplished quickly and efficiently, and, if possible, without the need of special stripping devices.

Generally, an object of this invention is to provide novel cutting mechanism for use in a clipper, which produces rapid cutting of a sheet of material in the clipper, and is readily stripped of material being fed into the cutting mechanism after a cut has been made.

More particularly, an object is to provide such cutting mechanism which includes a pair of movable cutting elements which move toward each other simultaneously in a cutting stroke to produce cutting.

The invention includes as cutting mechanism a knife and a cooperating anvil, with the knife below the anvil, an organization which has been discovered to eliminate substantially stripping problems, and means whereby both are movable toward each other simultaneously to produce a cut, a feature which has been found to increase the flexibility of a clipper (by enabling it to handle a wide range of sheet thicknesses), as well as the speed of the cutting action.

A related object is to provide novel power-operated means in a clipper, actuated by a motor, which produces simultaneous cutting strokes in a pair of cutting elements.

A further object of the invention is to provide novel toggle means in a clipper effective to produce simultaneous movement in a pair of opposed cutting elements, whereby the elements may be moved together and retracted in cutting and return strokes.

With the organization contemplated, comprising a movable knife disposed below a movable anvil, the work if it binds against a cutting element always binds against the knife, and no special stripping device is needed, since when the knife returns to a position below the conveyor means feeding the work after making a cut, the conveyor means which supports the work itself functions to strip the workpiece from the feed side of the knife.

These and other objects and advantages of the invention will become apparent from the following description, which is to be read in conjunction with the accompanying drawings, wherein:

FIG. 1 is a side elevational view of a clipper as contemplated by this invention showing a knife and anvil therein as they are positioned at the end of their cutting strokes;

FIG. 2 is another view of a portion of the clipper illustrated in FIG. 1, showing the knife and anvil spaced apart and in the position they are returned to after their cutting strokes;

FIG. 3 is a plan view, with portions removed of the clipper in FIG. 1; and

FIG. 4 is a front elevational view of a clipper according to a modification of the invention.

Turning now to the drawings and more particularly to FIGS. 1, 2 and 3, a clipper such as may be used to cut moving sheets of veneer and like workpieces is indicated generally at 2. The clipper includes a frame 3 and the feed end of the clipper is indicated generally at 4. Veneer may be fed into the clipper on a supply conveyer 6, which in the embodiment shown comprises multiple continuous belts 7 moved under power continuously (by means not shown), such belts being trained over pulleys secured to a shaft 8 which is journaled on frame 3 adjacent the feed end of the clipper.

Clipper 2 includes a cutting station 11, to be described in more particularity below, and on either side of the cutting station feed and offbearing conveyer systems indicated generally at 12 and 13, respectively.

Feed conveyer system 12 comprises multiple laterally spaced belts, such as the chain belt 14 shown in FIG. 1. Upper reaches of the belts provide support for the bottom faces of veneer pieces traveling into the cutting station. These belts may be trained over sprockets such as sprocket 15 secured to shaft 8, whereby the belts are moved by the same motor drive moving belts 7. Also training each of the belts are sprockets 16 and 17 journaled on a support arm 18. Each arm has one end journaled at 19 on shaft 8, and between its ends is supported by biasing means 20 interposed between the arm and frame 3. Biasing means 20 holds each arm with the upper reach of belt 14 substantially horizontal and is yieldable under pressure to permit downward swinging of the arm.

The feed conveyer system also includes a set of continuous belts, such as belts 21, with bottom reaches operable to engage the top faces of veneer pieces fed into the cutting station and thus hold the veneer flat on the upper reaches of belts 14. Each belt 21 is trained over a pulley 22 mounted on a shaft 24 extending transversely of the machine, and is further trained over pulleys 25, 26 rotatably mounted on a supporting arm 27. One set of ends of the supporting arms for the belts are journaled at 28 on shaft 24, to enable swinging of the arms, and up and down movement of their opposite set of ends. Biasing such opposite end of each arm downwardly is biasing means 29, including a rod 30 pivoted to the arm at 31 (such rod having its upper end slidably received in a suitable accommodating aperture provided in a pipe 32), a nut 33 fastened to the top end of the rod (to limit downward movement of the rod and the supporting arm connected to it), and a spring 34 biasing the rod and supporting arm to its lowermost position as defined by the nut.

Offbearing conveyer system 13 may comprise a series of belts such as belt 36, with an upper reach providing support for cut veneer pieces leaving the cutting station. These belts also normally are power driven, and rotate continuously, by means including the usual drive motor, also not shown.

The upper reaches of belts 7, 14 and 36 normally occupy substantially a common horizontal plane, and define a path of travel for uncut veneer into the cutting station and for cut veneer leaving the cutting station. Belts 21, which may be thought of as clamping belts, function to hold veneer in a flattened out condition on belts 14 immediately prior to a cut being produced therein. By inclusion of the biasing mechanism described, the bottom runs of these clamping belts are yieldable upwardy to accommodate veneer of different thicknesses.

The clipper at cutting station 11 includes a pair of elongated, opposed cutting devices, and in FIGS. 1, 2 and 3 these are shown at 37 and 38, respectively.

Cutting device 37 includes a rockable mounting 40 journaled on opposite sides of the frame at 42. Detachably mounted, as by fasteners 44, to this mounting is an anvil 46 extending transversely of the path of work through the clipper. The cutting device is rockable about its journals, to produce up and down movement of the anvil, as can be seen by comparing FIGS. 1 and 2.

Cutting device 38 which cooperates with device 37 to produce cuts includes a rockable mounting 48 similar to mounting 40, journaled on the frame at opposite sides of the frame at 50. An elongated knife 52 substantially paralleling the anvil is detachably mounted on mounting 48 by fasteners 54. The knife thus is shiftable up and down with rocking movement of mounting 48 in a region below the anvil.

Cutting devices 37, 38 rock about axes displaced from one another in a direction extending longitudinally of the clipper a sufficient distance so that when the devices are rocked to move the knife and anvil toward each other, the knife and anvil move in substantially straight paths and vertically with respect to the workpiece that is to be severed.

The anvil shown is reversible, in that either the top or the bottom edge thereof shown in FIG. 1 may be placed in a position to provide support for a piece of veneer being cut. Along each of its edges are a pair of shoulders shown at 56, 58 separated by a void 60. During the cutting of a piece of veneer the knife below the anvil travels into this void between the shoulders. After any degree of cutting, this void fills with slivers of wood, whereby a somewhat resilient mounting which can have a cutting edge thrust thereagainst is provided above the workpiece in the path of the knife.

Describing now operating structure operable on actuation to move the knife and anvil toward and away from each other, journaled at 61 on each side of the frame and linked to both of the cutting devices by a toggle link mechanism 62 is a motor 64, more specifically a double-acting fluid-operated ram. The motor and the toggle link mechanism on each side of the frame are similar, and thus this structure on only one side of the frame will be described in detail.

As can be seen with reference to the motor and toggle link mechanism facing the viewer in FIGS. 1 and 2, the motor includes an extensible part or piston rod 66, which has mounted on the outer end thereof a toggle link connector 68. Journaled at one end to connector 68, at 70, is a rod 72, which has its opposite end fastened to another link connector 74.

Link connector 68 is pivotally connected to one set of ends of a pair of toggle links 76, 78, which have their opposite set of ends pivotally connected to a crank arm 80 joined to rockable mounting 40, and a mounting plate 82 fastened to the side of the frame, respectively. Link connector 74 is pivotally connected in a similar manner to toggle links 84, 86, which have spaced apart ends journaled to a crank arm 88 joined to rockable mounting 48 and a mounting plate 90 secured to the side of the frame, respectively.

FIG. 2 illustrates the two rockable mountings in a position where the anvil and knife are spaced apart and motor 64 is fully extended. On contraction of the motor the various toggle links are moved to an over center positon as shown in FIG. 1 which shifts the knife and anvil toward each other in a cutting stroke. On further contraction of the motor the toggle links move past their over-center position, to return the knife and anvil to their spaced-apart position. Extension of the motor produces similar shifting of the toggle links into and beyond an over-center position for the links, with the knife and anvil moving in cutting and return strokes.

A modification of the invention comprising a movable knife and anvil with the anvil mounted above the path of travel for the work and the knife below is illustrated in somewhat simplified form in FIG. 4. In this modification of the invention, the knife and anvil which are similarly identified by numbers 52 and 46, are mounted on mountings suitably guided for vertical movement, shown at 92 and 94, respectively. Mountings 92, 94, instead of rocking toward and away from each other, move in straight and aligned paths on actuation of toggle link mechanisms 96, 98 interposed between the mountings and frame structure 100 of the clipper.

As ilustrated with reference to toggle link mechanism 96 each comprises paired links 102, 104 with adjacent ends journaled to a connector bar 106 and spaced-apart ends journaled to one of the mountings and to the frame structure of the clipper, respectively. Toggle link mechanisms 96, 98 are actuated simultaneously by a motor, more specifically a double-acting fluid-operated ram 110 pivoted at 112 to suitable frame structure, and having rods extending out from opposite ends connected to the toggle link mechanisms. The connection between the ends of the rods and the toggle link mechanisms, as illustrated with reference to toggle link mechanism 96, may be through a plate 114 pivoted to a rod as at 116, pivoted to the frame structure of the clipper as at 118, and connected to a toggle link mechanism as through pivoted link 120.

Each of the two modifications of clipper shown have particular advantages. In both modifications, however, it will be noted that a knife and anvil are provided where cutting is performed by the knife coming against the anvil, with a shoulder on the feed side of the anvil and knife supporting the work while the same is cut whereby it is the knife that penetrates and extends through the workpiece. Further, in both modifications the anvil is disposed above the knife, and the knife and anvil are both moved together simultaneously to produce cutting. In both modifications, the knife and anvil are returned after their cutting strokes to regions spaced to one side of the path for work through the clipper.

Explaining generally how the clipper may operate in the cutting of veneer, as already indicated it is usual for the veneer to be fed continuously and preferably at a fairly fast rate of speed into the cutting station of the clipper. Before a cut is made, and because the knife and anvil are both movable, each may be placed substantially to one side of opposite faces of veneer, whereby the same is permitted easily to pass through the cutting station, and this travel is accommodated regardless of variations in veneer thickness.

On cutting, as already indicated, the knife and anvil both move against opposite faces of the veneer with the anvil supporting the top face of the veneer while the knife penetrates through the veneer to come up against the anvil. With both the knife and anvil movable, the time which elapses during the cutting stroke is substantially less than in a construction where only one of the elements is actuated. This reduces the tendency for the veneer to buckle on the feed side of the cutting station when progress of the veneer is temporarily stopped by the knife.

When the knife and anvil start to move away in their return strokes, because the knife is the element which has passed through the work (the work having been supported by the anvil), the sheet across the clipper throughout the length of the knife tends to follow the knife which is the element which is moving downwardly. Because the sheet follows the knife exclusively, the formation of ripples in the sheet in the form of corrugations, such as are produced with certain types of clippers, is inhibited.

On the knife being retracted stripping of the knife is performed, without the need of a special stripping agency, by the action of conveyor belts 14 which support the bottom face of the uncut veneer advancing into the cutting station while the knife moves under the plane generally defined by the upper reaches of these conveyor belts. There is no tendency for the knife to lift the work off of its support, as in constructions where the knife is disposed above the work and shifts upwardly on a return stroke.

While several embodiments of the invention have been described, it is not intended thereby to be specifically limited as various modifications and variations are possible without departing from the invention. It is desired to cover all such modifications as would be apparent to one skilled in the art and that come within the scope of the appended claims.

I claim:

1. A clipper for cutting sheets of veneer and like workpieces comprising
   a frame having a work path extending longitudinally therethrough,
   a pair of rockable opposing cutting devices journaled to said frame, one of said devices being above the work path, the other being below the path,
   each of said cutting devices extending transversely of the work path and comprising an elongated rocker mounted for rocking movement about its longitudinal axis,
   said one cutting device including an anvil having a shoulder on the feed side of said knife which supports a face of the workpiece during cutting of the workpiece,
   said other cutting device including a knife,
   a common motor mounted on said frame adjacent one side thereof, operable on actuation to produce a cutting stroke in each of said cutting devices, and
   toggle means adjacent said one side of said frame linking said cutting devices with said motor whereby said knife and said anvil are moved in their cutting strokes simultaneously on acutation of the motor.

2. The structure of claim 1 wherein said toggle means comprises a pair of toggle links with a joint connecting them to the cutting device with the knife, and a pair of toggle links with a joint connecting them to the cutting device with the anvil, the motor is journaled on said frame, and includes an extensible part, and said extensible part is connected to said pairs of toggle links adjacent their said joints.

3. A clipper for cutting sheets of veneer and like workpieces comprising a frame; a cutting station on said frame; means on the frame operable continuosly to urge a flow of veneer through the clipper toward said cutting station and defining a substantially horizontally extending path for the travel of such veneer through the clipper with such path extending from a feed to an off bearing end of the clipper; an elongated knife element and a substantially parallel elongated anvil element, both extending transversely of said path, and occupying a position where one of said elements is above said path and the other of said elements is below said path whereby veneer travel between the knife and anvil elements is accommodated; operating structure connected to the knife and anvil elements operable on actuation first to move the two elements simultaneously in a cutting pass toward each other and into said path for the veneer with the element above said path moving downwardly into the path and the element below said path moving upwardly into said path to meet the first-mentioned element, and then to move the two elements simultaneously away from each other in a return pass which returns the elements to their original position; said anvil element including a shoulder located toward the feed end of the clipper from the knife element which at the end of the cutting pass for the element is effective to support a face of veneer located on the feed end of the clipper from the knife element and prevent such veneer by reason of its urged flow through the clipper from crowding against the anvil element in such a way as to cause the veneer to follow the anvil element during said return pass when it returns to one side of said path; said means defining a path for the travel of veneer including means for bearing on the opposite face of the veneer and preventing such veneer from following the knife element on its return pass.

4. A clipper for cutting sheets of veneer and like workpieces comprising a frame; a cutting station on said frame; conveyor means on the frame operable continuously to urge a flow of veneer through the clipper toward said cutting station and to support such veneer while defining a substantially horizontal path for the travel of veneer through the clipper with said path extending from a feed to an off bearing end of the clipper; an elongated knife element extending transversely of said path occupying a position below said path of travel and an elongated anvil element substantially paralleling said knife element occupying a position above said path of travel whereby veneer travel between the knife and anvil elements is accommodated; operating structure connected to the knife and anvil elements operable on actuation first to move the two elements simultaneously in a cutting pass toward each other and into said path with the anvil element above said path moving downwardly thereinto and the knife element below said path moving upwardly thereinto to meet the anvil element, and then to move the two elements simultaneously away from each in a return pass to return the knife and anvil elements to their original positions on either side of said path; said anvil element including a shoulder which is located toward the feed end of the clipper from the knife element at the end of the cutting pass for the two elements, which shoulder is effective to support the top face of veneer disposed toward the feed end of the clipper from the knife element and prevent such veneer by reason of its urged flow through the clipper from crowding against the anvil element in such a way as to cause the veneer to follow the anvil element upwardly during its return pass; said conveyor including a portion disposed to the feed end of the clipper from the knife element which supports the bottom face of the veneer adjacent the knife element and is operable on return movement of the knife element in its return pass to bear against the bottom face of the veneer and prevent the veneer adjacent where it has just been cut from moving with the knife element out of the defined path of travel for the veneer through clipper.

5. A clipper for cutting sheets of veneer and like workpieces comprising a frame, and conveyor means on the frame defining a work path extending substantially horizontally therethrough; a cutting device comprising an elongated support member, and an elongated anvil mounted on said support member, mounted on said frame above said path of travel; another cutting device comprising an elongated support member, and an elongated knife mounted on said support member, mounted on said frame below said path of travel on said frame; said anvil having a shoulder disposed on the feed side of said knife which supports a face of the veneer during cutting of the veneer; toggle means adjacent one side of the frame linking the two cutting devices; said toggle means comprising a pair of toggle links and a pivot joint interconnecting the links for one cutting device and another pair of toggle links and a pivot joint interconnecting the links for the other cutting device, the toggle links for a cutting device moving past an over center position on movement of the cutting device in cutting and return passes; and a common extensible-contractable motor mounted on said side of said frame operable on either extension or contraction to produce movement of the pair of toggle links for each cutting device past its said over center position.

References Cited by the Examiner
UNITED STATES PATENTS

| | | | |
|---|---|---|---|
| 1,651,834 | 12/1927 | Novick | 83—623 |
| 1,686,392 | 10/1928 | Noll | 83—623 |
| 1,985,780 | 12/1934 | Hoppe et al. | 83—600 |
| 2,518,871 | 8/1950 | Craig | 83—600 |
| 2,711,792 | 6/1955 | McFall | 83—620 |
| 2,825,402 | 3/1958 | Bostrom | 83—630 |
| 2,890,749 | 6/1959 | Anderson | 83—604 |

WILLIAM W. DYER, JR., *Primary Examiner.*

L. B. TAYLOR, *Assistant Examiner.*